United States Patent Office 3,389,050
Patented June 18, 1968

3,389,050
TREATMENT OF HYPERLIPIDEMIA WITH 3-METHYL - 5 - ALKYLPYRAZOLE - 1 - CARBOXAMIDE
William E. Dulin and John B. Wright, Kalamazoo, Mich., assignors to The Upjohn Company, Kalamazoo, Mich., a corporation of Delaware
No Drawing. Filed Apr. 19, 1965, Ser. No. 449,303
2 Claims. (Cl. 167—65)

ABSTRACT OF THE DISCLOSURE

A method for treating hyperlipidemia in mammals by administering a substituted pyrazole of the formula

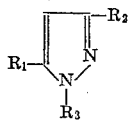

wherein $R_1$ and $R_2$ are alkyl, and $R_3$ is selected from the group consisting of carboxyl, alkoxycarbonyl, carbamoyl and mono- and dialkyl-substituted carbamoyl, said alkyl groups containing 1 through 4 carbon atoms, and physiologically acceptable salts thereof.

---

This invention relates to a method for treating hyperlipidemia with compositions containing certain substituted pyrazoles.

The primary active ingredients utilized in the novel method of this invention are (1) compounds of the formula

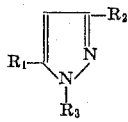

wherein $R_1$ and $R_2$ are alkyl, $R_3$ is carboxyl, alkoxycarbonyl, carbamoyl, or mono- or dialkyl-substituted carbamoyl, the alkyl groups containing 1 through 4 carbon atoms, and (2) physiologically acceptable salts of the foregoing compounds. By "salts" is meant acid addition salts, such as the hydrochloride, cyclohexylsulfamate, sulfate, acetate, nitrate, phosphate, citrate, maleate, tartrate, succinate, pamoate, p-toluenesulfonate, benzenesulfonate, and the like of the foregoing pyrazoles; alkali metal salts (such as sodium and potassium), alkaline earth metal salts (such as aluminum, calcium and magnesium), amine salts (such as N,N'-dibenzylethylenediamine, procaine and diethanolamine), and ammonium salts of the carboxypyrazoles; and metal salt complexes of the formula

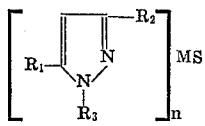

wherein $R_1$, $R_2$ and $R_3$ are as above defined, $n$ is an integer less than 3, and MS is a physiologically acceptable metal salt, such as the chlorides, bromides, phosphates, sulfates, nitrates, acetates, and carbonates of zinc, iron, aluminum, magnesium, calcium and the like.

Representative compounds of the foregoing, recognized in U.S. Patent No. 3,150,148 for their hypoglycemic activities have now been discovered to afford a useful method for treating such conditions as atherosclerosis, arteriosclerosis, blood-clotting defects due to lipemia, and other entities in which the underlying etiology is associated with lipid imbalance or hyperlipidemia. Correction of hyperlipidemia in mammals is achieved through reduction of free fatty acids and triglycerides of the blood.

The method of this invention comprises administration of the primary active ingredients described above, in pharmaceutical compositions adapted to the conditions of use by techniques known in the art, to animals in safe and effective amounts determined individually according to the subject's age, weight, response to the medication and severity of the condition being treated. Total daily doses range from about 1 to 2000 mg. and preferably 10 to about 1000 mg., given in single or divided doses.

Illustrative of the hypolipidemic effect of these compounds is the following:

Intact male rats (Sprague-Dawley) were treated orally with the test compound, 3,5-dimethylpyrazole-1-carboxamide, following overnight fast. Two hours after treatment the animals were anesthetized with 5-allyl-5-(2-cyclopenten-1-yl)barbituric acid (Cyclopal), and blood was obtained from the posterior vena cava. Plasma free fatty acids (FFA) were determined in triplicate by the method of Dole (J. Clin. Invest. 35:150 [1956]). Results were as follows:

EXPERIMENT I

| No. Rats | Treatment | Dose, Mg./Kg. | FFA, µe/liter |
|---|---|---|---|
| 5 | Control | | 1,404 |
| 5 | Test compound | 3.0 | 1,295 |
| 5 | do | 6.0 | 637 |

EXPERIMENT II

| | | | |
|---|---|---|---|
| 5 | Control | | 1,152 |
| 5 | Test Compound | 6.25 | 734 |

The test compound, 3,5-dimethylpyrazole-1-carboxamide, thus was shown to reduce free fatty acids by 30–50%. In other studies this compound was found to have an $LD_{50}$ of 2144 mg./kg. intraperitoneally in mice and 3113 mg./kg. orally in rats, indicating extremely low toxicity and an excellent therapeutic ratio.

What is claimed is:
1. A method for treating hyperlipidemia in mammals comprising: administering to hyperlipidemic mammals from about 1 to about 2000 mg. of a compound selected from the group consisting of (1) 3-methyl-5-alkylpyrazole-1-carboxamide, said alkyl group containing 1 through 4 carbon atoms, and (2) physiologically acceptable salts thereof.
2. A method for treating hyperlipidemia in mammals comprising: administering to hyperlipidemic mammals from about 10 to about 1000 mg. of 3,5-dimethylpyrazole-1-carboxamide.

References Cited

UNITED STATES PATENTS 3,150,158   9/1964   Dulin _____ 210—310

ALBERT T. MEYERS, *Primary Examiner.*

S. FRIEDMAN, *Assistant Examiner.*